United States Patent
Renken et al.

(10) Patent No.: US 12,320,466 B2
(45) Date of Patent: Jun. 3, 2025

(54) SYSTEMS AND METHODS FOR LIMITING ROTATION OF A SUPPORTED OBJECT

(71) Applicant: BAE Systems Space & Mission Systems Inc., Broomfield, CO (US)

(72) Inventors: Federick Renken, Boulder, CO (US); Miroslaw A. Ostaszewski, Louisville, CO (US); Grady Egan, Frederick, CO (US); Lathan Collins, Denver, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 763 days.

(21) Appl. No.: 17/675,024

(22) Filed: Feb. 18, 2022

(65) Prior Publication Data

US 2022/0290800 A1    Sep. 15, 2022

Related U.S. Application Data

(60) Provisional application No. 63/158,945, filed on Mar. 10, 2021.

(51) Int. Cl.
| | |
|---|---|
| *F16M 11/12* | (2006.01) |
| *F16C 11/10* | (2006.01) |
| *F16C 11/12* | (2006.01) |
| *F16F 15/04* | (2006.01) |

(52) U.S. Cl.
CPC ............ *F16M 11/12* (2013.01); *F16C 11/10* (2013.01); *F16C 11/12* (2013.01); *F16F 15/04* (2013.01); *F16C 2370/20* (2013.01); *F16M 2200/024* (2013.01)

(58) Field of Classification Search
CPC ..... F16M 11/12; F16M 2200/024; F16L 1/10; F16L 1/11; F16F 15/04; F16C 2370/20
USPC ........................................................... 359/872
See application file for complete search history.

(56) References Cited

U.S. PATENT DOCUMENTS

| | | | |
|---|---|---|---|
| 854,426 A | 5/1907 | Lowry | |
| 1,013,786 A | 1/1912 | Lambert | |
| 1,334,557 A | 3/1920 | Ruff | |
| 1,602,912 A | 10/1926 | Leipert | |
| (Continued) | | | |

FOREIGN PATENT DOCUMENTS

| | | |
|---|---|---|
| DE | 3241373 | 5/1984 |
| EP | 0348845 | 1/1990 |
| (Continued) | | |

OTHER PUBLICATIONS

U.S. Appl. No. 17/397,637, filed Aug. 9, 2021, Ostaszewski.
(Continued)

*Primary Examiner* — Jerry L Brooks
(74) *Attorney, Agent, or Firm* — Sheridan Ross P.C.

(57) ABSTRACT

Systems and methods for limiting rotation of a supported object about an axis of rotation are provided. A system as disclosed includes a stop system that engages at a selected amount of rotation about an axis of rotation to provide a balanced force countering further rotation. The stop system includes one or more pairs of stop mechanisms, with one stop mechanism in a pair disposed to act from a first side of the axis of rotation, and a second stop mechanism in the pair disposed to act from a second side of the axis of rotation. Each stop mechanism can include stops that engage a flexure at a selected amount of rotation.

20 Claims, 7 Drawing Sheets

(56) References Cited

U.S. PATENT DOCUMENTS

| | | |
|---|---|---|
| 1,952,970 A | 3/1934 | Brofelth |
| 2,484,823 A | 10/1949 | Hammond, Jr. |
| 2,990,720 A | 7/1961 | Scholtes |
| 3,060,334 A | 10/1962 | Favre |
| 3,156,759 A | 11/1964 | Collen |
| 3,181,851 A | 5/1965 | Troeger |
| 3,181,918 A | 5/1965 | Troeger |
| 3,188,071 A | 6/1965 | Owen |
| 3,234,844 A | 2/1966 | Fain et al. |
| 3,246,890 A | 4/1966 | Ormond |
| 3,252,696 A | 5/1966 | Friedel |
| 3,453,464 A | 7/1969 | Baker, Jr. |
| 3,465,997 A | 9/1969 | Piske |
| 3,469,418 A | 9/1969 | Stabeler et al. |
| 3,532,408 A | 10/1970 | Dostal |
| 3,592,422 A | 7/1971 | Paine et al. |
| 3,612,643 A | 10/1971 | Weber |
| 3,743,268 A | 7/1973 | Heiland |
| 3,807,029 A | 4/1974 | Troeger |
| 3,811,665 A | 5/1974 | Seelig |
| 3,813,089 A | 5/1974 | Troeger |
| 3,825,992 A | 7/1974 | Troeger |
| 3,909,077 A | 9/1975 | Leonarduzzi |
| 3,952,217 A | 4/1976 | Rawlings |
| 3,981,566 A | 9/1976 | Frank et al. |
| 3,998,092 A | 12/1976 | Maccabee |
| 4,025,203 A | 5/1977 | Lee |
| 4,060,315 A | 11/1977 | Heinz |
| 4,160,177 A | 7/1979 | Ascoli |
| 4,230,291 A | 10/1980 | Marshall II, deceased |
| 4,261,211 A | 4/1981 | Haberland |
| 4,302,709 A | 11/1981 | Tichtinsky |
| 4,306,463 A | 12/1981 | King |
| 4,327,527 A | 5/1982 | Seelig et al. |
| 4,380,108 A | 4/1983 | Craig |
| 4,382,709 A | 5/1983 | Brown |
| 4,439,003 A | 3/1984 | Roth |
| 4,460,252 A | 7/1984 | Volleau et al. |
| 4,497,465 A | 2/1985 | Yeakley et al. |
| 4,507,979 A | 4/1985 | Zebrowski |
| 4,511,115 A | 4/1985 | Ludwigsen |
| 4,533,100 A | 8/1985 | Paseri |
| 4,538,882 A | 9/1985 | Tanaka et al. |
| 4,540,141 A | 9/1985 | Durno et al. |
| 4,613,203 A | 9/1986 | Proetel et al. |
| 4,619,498 A | 10/1986 | Croiset |
| 4,637,596 A | 1/1987 | Lewis |
| 4,655,629 A | 4/1987 | Flaherty |
| 4,678,295 A | 7/1987 | Fisher |
| 4,723,456 A | 2/1988 | Kohler et al. |
| 4,732,440 A | 3/1988 | Gadhok |
| 4,738,500 A | 4/1988 | Grupp et al. |
| 4,770,522 A | 9/1988 | Alten |
| 4,782,475 A | 11/1988 | Chandler |
| 4,802,720 A | 2/1989 | Paulsen |
| 4,802,784 A | 2/1989 | Brooks |
| 4,812,072 A | 3/1989 | Brooks |
| 4,825,713 A | 5/1989 | Wilkey |
| 4,861,125 A | 8/1989 | Vaught |
| 4,902,083 A | 2/1990 | Wells |
| 4,919,382 A | 4/1990 | Forman |
| 4,919,993 A | 4/1990 | Woodruff |
| 4,932,210 A | 6/1990 | Julien et al. |
| 4,973,145 A | 11/1990 | Kirkwood et al. |
| 4,977,791 A | 12/1990 | Erichsen |
| 4,997,123 A | 3/1991 | Backus et al. |
| 5,009,473 A | 4/1991 | Hunter et al. |
| 5,015,831 A | 5/1991 | Eastman et al. |
| 5,066,084 A | 11/1991 | Culp |
| 5,097,356 A | 3/1992 | Paulsen |
| 5,110,195 A | 5/1992 | Loney |
| 5,267,720 A | 12/1993 | Brazell et al. |
| 5,277,076 A | 1/1994 | Ostaszewski |
| 5,283,682 A | 2/1994 | Ostaszewski |
| 5,315,890 A | 5/1994 | Long |
| 5,521,740 A | 5/1996 | Brosens |
| 5,529,277 A | 6/1996 | Ostaszewski |
| 5,620,169 A | 4/1997 | Payne |
| 5,703,732 A | 12/1997 | Boddy et al. |
| 6,198,180 B1 * | 3/2001 | Garcia .............. G02B 26/0816 359/872 |
| 6,275,624 B1 | 8/2001 | Seddon |
| 6,283,666 B1 | 9/2001 | Genequand |
| 6,300,665 B1 | 10/2001 | Peeters et al. |
| 6,327,065 B1 | 12/2001 | Danial et al. |
| 6,365,252 B1 | 4/2002 | Ortiz et al. |
| 6,428,929 B1 | 8/2002 | Koy et al. |
| 6,625,342 B2 * | 9/2003 | Staple .................. B81B 3/0016 307/143 |
| 6,661,962 B1 | 12/2003 | Calvet et al. |
| 6,862,122 B1 | 3/2005 | Moore |
| 6,972,885 B2 | 12/2005 | Hiley et al. |
| 7,227,111 B2 | 6/2007 | Eckelkamp-Baker et al. |
| 7,354,170 B2 | 4/2008 | Ishikawa |
| 7,515,385 B1 | 4/2009 | Abrahamson et al. |
| 7,538,959 B1 | 5/2009 | Wheeler |
| 8,556,533 B2 | 10/2013 | Bullard |
| 8,702,337 B2 | 4/2014 | Whitney et al. |
| 8,708,593 B2 | 4/2014 | Stratton |
| 8,724,095 B2 | 5/2014 | Goodwin et al. |
| 9,057,610 B2 | 6/2015 | Graesser et al. |
| 9,212,691 B2 | 12/2015 | Smith |
| 9,354,422 B1 | 5/2016 | Quakenbush |
| 9,612,436 B1 | 4/2017 | Hoffman et al. |
| 9,880,263 B2 | 1/2018 | Droz et al. |
| 9,954,612 B1 | 4/2018 | La Fata |
| 10,139,617 B2 | 11/2018 | Bullard |
| 10,443,649 B2 | 10/2019 | Balaban et al. |
| 10,591,676 B1 | 3/2020 | Ostaszewski et al. |
| 10,598,924 B2 | 3/2020 | Ostaszewski |
| 10,914,339 B2 | 2/2021 | Warden |
| 2002/0101287 A1 | 8/2002 | Fowler |
| 2002/0176683 A1 | 11/2002 | Harman et al. |
| 2003/0026526 A1 | 2/2003 | Trissel et al. |
| 2003/0160540 A1 * | 8/2003 | Miller ................ G02B 26/0841 310/309 |
| 2004/0140737 A1 | 7/2004 | Barillot et al. |
| 2005/0173770 A1 | 8/2005 | Linden et al. |
| 2005/0179976 A1 | 8/2005 | Davis et al. |
| 2005/0280879 A1 | 12/2005 | Gibson et al. |
| 2006/0062528 A1 | 3/2006 | Morris et al. |
| 2008/0219705 A1 | 9/2008 | Lee |
| 2009/0245307 A1 | 10/2009 | Iida et al. |
| 2010/0208322 A1 | 8/2010 | Borchers |
| 2012/0236379 A1 | 9/2012 | da Silva et al. |
| 2014/0208848 A1 | 7/2014 | Krylov et al. |
| 2016/0259252 A1 | 9/2016 | Suzuki et al. |
| 2018/0095223 A1 | 4/2018 | Wiley et al. |
| 2018/0252260 A1 | 9/2018 | Bullard |
| 2018/0252261 A1 | 9/2018 | Bullard |
| 2019/0120287 A1 | 4/2019 | Cosandier et al. |
| 2020/0008827 A1 | 1/2020 | Dearden et al. |
| 2021/0263292 A1 | 8/2021 | Visser et al. |

FOREIGN PATENT DOCUMENTS

| | | |
|---|---|---|
| EP | 1013949 | 6/2000 |
| EP | 1887398 | 2/2008 |
| EP | 3324193 | 5/2018 |
| GB | 939741 | 10/1963 |
| GB | 1454427 | 11/1976 |

OTHER PUBLICATIONS

U.S. Appl. No. 17/723,142, filed Apr. 18, 2022, Balaban et al.

Markovic et al. "Characterization of cross-spring pivots for micropositioning applications," Proceedings of SPIE, Smart Sensors, Actuators, and Mems VII; and Cyber Physical Systems, May 2015, vol. 9517, 951727, 8 pages.

Allegranza et al. "Actuators for Space Applications: State of the Art and New Technologies," Actuator 2014, 14th International Conference on New Actuators, Jun. 23-25, 2014, Bremen, Germany, pp. 283-288, 38 pages.

(56) References Cited

OTHER PUBLICATIONS

Awtar et al. "An XYZ Parallel-Kinematic Flexure Mechanism With Geometrically Decoupled Degrees of Freedom," Journal of Mechanisms and Robotics, Feb. 2013, vol. 5, No. 1, 015001, 8 pages.
Letty et al. "Miniature Piezo Mechanisms for Optical and Space Applications," Actuator 2004, 9th International Conference on New Actuators, Jun. 14-16, 2004, Bremen, Germany, pp. 177-180.
Shimizu et al. "Development of Fine Pointing Mechanism for Optical Inter-Satellite Communication," Proceedings of the International Conference on Space Optical Systems and Applications (ICSOS), May 7-9, 2014, Kobe, Japan, 7 pages.
Syms et al. "Scalable electrothermal MEMS actuator for optical fibre alignment," Journal of Micromechanics and Microengineering, 2004, vol. 14, pp. 1633-1639.
Wang et al. "Four-plate piezoelectric actuator driving a large-diameter special optical fiber for nonlinear optical microendoscopy," Optics Express, Aug. 2016, vol. 24, No. 17, pp. 19949-19960.

\* cited by examiner

SYSTEMS AND METHODS FOR LIMITING ROTATION OF A SUPPORTED OBJECT

CROSS-REFERENCE TO RELATED APPLICATIONS

This application claims the benefit of U.S. Provisional Patent Application Ser. No. 63/158,945, filed Mar. 10, 2021, the entire disclosure of which is hereby incorporated herein by reference.

FIELD

The present disclosure provides systems and methods for limiting rotation in a flexure or suspension system for supporting objects, such as mirrors, that allows for rotation about one or more axes while minimizing translational movement.

BACKGROUND

Suspension systems for supporting an object and that allow for rotation or oscillation of the object about one or more axes, while limiting or minimizing any translational movement of the object, are used in various applications. Optical scanning systems are a typical example of a type of system which requires a flexible suspension system having a high scanning frequency. In a steering mirror type optical scanning system, a mirror is actuated to rapidly scan back and forth across an angular excursion.

In optical scanning or other systems incorporating flexure type suspensions, stops are required to absorb energy and prevent over travel of the flexure mechanism. This is particularly important in situations where the mirror or other supported object may lose control, for instance due to a runaway condition, or where the object is subject to high external vibration levels or acceleration loads. In a typical mechanism, a stop is provided on one side of an axis of rotation of the system. When the stop is engaged, loads can spike in the rotation flexure of the mirror, and can cause the mirror to translate on its flexure mounting. This can in turn result in high forces and stresses in the flexure mechanism. Moreover, as recent designs have featured ever larger mirrors, increased amounts of travel, or both, the need to effectively limit the forces transmitted to suspension systems has increased.

SUMMARY

Embodiments of the present disclosure provide stop mechanism systems and methods. The stop mechanism systems and methods are particularly applicable in connection with flexure type suspension systems, which allow for rotation of an object about selected axes, while limiting or minimizing translational movement. A stop system in accordance with embodiments of the present disclosure provides balanced braking or deacceleration forces on opposite sides of an axis of rotation when the stop mechanism is engaged. This prevents the object supported by the suspension system from translating, and decreases the stresses in the suspension system. This in turn extends the working life of the suspension system.

In accordance with embodiments of the present disclosure, the stop system includes stop mechanisms that apply braking forces on opposite sides of each axis about which an object supported by a suspension system is rotated. Each stop mechanism can include a pair of stops mounted on a moving or fixed component of the suspension system, and a flexure or energy dissipating assembly on the other of the moving or fixed component of the suspension system. The flexure assembly includes a flexure member. In at least some embodiments, the flexure member is provided as a spring. In addition, the flexure assembly can include a contact member that is located between the stop and the flexure member. For instance, a contact member in the form of a resilient pad can be fixed to an end of the flexure member. In accordance with further embodiments of the present disclosure, the flexure member can be provided as a cantilevered member with a first end that is fixed to the suspension system and a second end located to come in contact with the stop when the suspension system is at or near a limit of travel. In accordance with further embodiments of the present disclosure, stop mechanisms as disclosed herein can be provided for each axis of rotation of the suspension system.

In operation, rotation of the object about a defined axis of rotation can be initiated by an actuator. As the rotation of the object nears the limit of rotation about the axis, the stop system engages. More particular, stop mechanisms on either side of the axis of rotation engage. In accordance with embodiments of the present disclosure, stop mechanisms are arranged to operate in sets of two or more stop mechanisms. In accordance with embodiments of the present disclosure, each set of stop mechanisms includes the same number of stop mechanisms on both sides of the axis or axes of rotation with respect to which the stop mechanisms can be engaged. Accordingly, an example stop system includes a pair of stop mechanisms, with one stop mechanism on each side of an axis of rotation of a suspended object. Each stop mechanism within a pair can engage simultaneously. Moreover, each stop mechanism can apply the same amount of braking force for a given angle of rotation of the object about the axis of rotation. A set of stop mechanisms as disclosed herein can be disposed relative to each axis of rotation of the suspension system. Moreover, multiple stop mechanism sets can be provided for each axis of rotation. In accordance with further embodiments of the present disclosure, a set of stop mechanisms can be disposed such that the stop mechanisms are engaged in response to rotation about multiple axes.

Additional features and advantages of embodiments of the present disclosure will become more readily apparent from the following description, particularly when taken together with the accompanying drawings.

DETAILED DESCRIPTION

Figure 1:
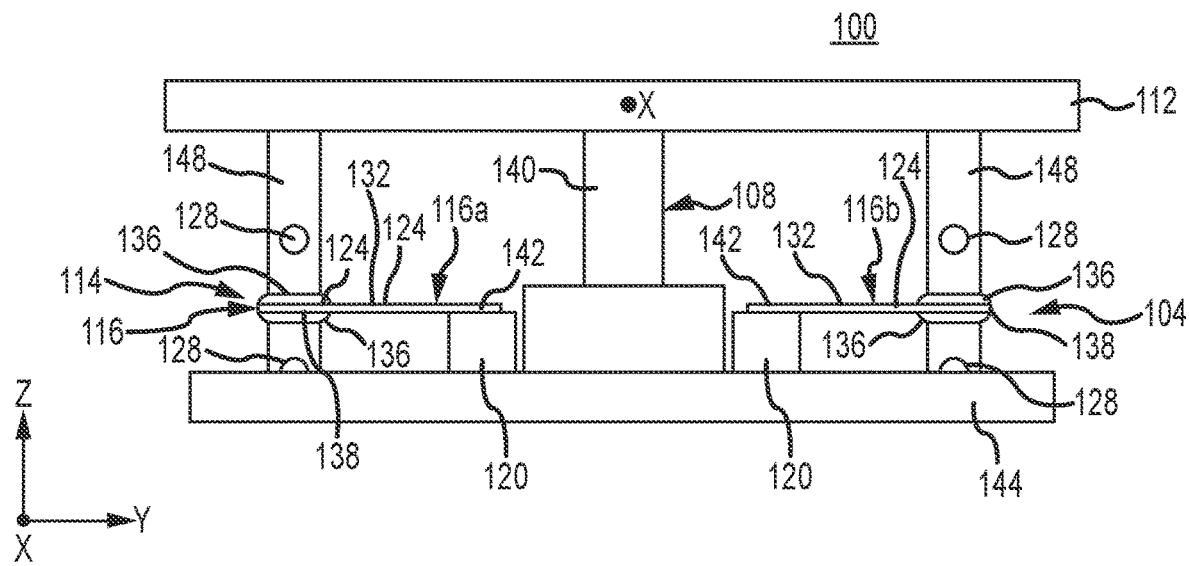
FIG. 1 is a view in elevation of an assembly including a stop system in accordance with embodiments of the present disclosure.

FIG. 1 is a view in elevation of an assembly 100 including a stop system 104 in accordance with embodiments of the present disclosure. In this example, the assembly 100 includes a suspension system 108 supporting an object 112. As examples, but without limitation, the assembly 100 can be part of an optical system, the suspension system 108 can be in the form of a cross-flexure suspension, and the supported object 112 can be a mirror. As can be appreciated by one of skill in the art after consideration of the present disclosure, the assembly 100 can include one or more actuators (not shown), for moving the object 112 to a desired angle of inclination relative to one or more axes of rotation in a controlled manner. Accordingly, embodiments of the present disclosure have application in connection with fast steering mirrors used in optical systems, or in any other mechanism in which a supported object is moved about one or more axes.

The stop system 104 includes a set 114 of stop mechanisms 116. Each set 114 of stop mechanisms 116 includes at least two (i.e. at least a pair) of stop mechanisms 116, with at least a first stop mechanism 116a disposed or acting on a first side of an axis of rotation X of the suspension system 108, and at least a second stop mechanism 116b disposed or acting on a second side of the axis of rotation X. Each stop mechanism 116 includes a mount 120, a flexure assembly 124, and a pair of stops 128. In accordance with at least some embodiments of the present disclosure, the flexure assembly 124 includes a flexure member 132 and a pair of contact members 136. A first or free end 138 of each flexure member 132 is free to move in two opposite directions within at least a first range of movement. In accordance with at least some embodiments of the present disclosure, a second or fixed end 142 of each flexure member 132 is connected or fixed to a base 144 via the mount 120. The mount 120 can itself be fixed to the base 144, can be integral to the base 144, or can be integral to the flexure member 132.

The suspension system 108 can include a cross-flexure, gimbal, hinge, or other suspension mechanism 140 that allows for movement of the supported object 112 about one or more axes of rotation. Accordingly, the suspension mechanism 140 can include a first component or portion that is fixed to the supported object 112, and a second component or portion that is fixed to the base 144. Moreover, the suspension mechanism 140 can be configured so as to inhibit or minimize translational movement of the object 112. Alternatively or in addition, the suspension mechanism 140 can be configured to maintain the object at a selected neutral position in the absence of an applied force, such as may be supplied by operation of one or more actuators. Although the axis of rotation X in various of the illustrated embodiments is shown as extending through at least a portion of the object 112, it should be appreciated that a location of the axis of rotation is generally defined by the suspension mechanism 140, and that all or portions of the object 112 can be spaced apart from the axis about which the suspension mechanism 140 allows the object 112 to move.

As depicted, the stops 128 of the stop system 104 can be connected to or integral with the supported object 112 or with a support frame or portion on a supported or moving side of the support mechanism 140. In particular, in the illustrated embodiment, the stops 128 are connected to the supported object by struts 148. The stops 128 in such an embodiment are therefore in a fixed relationship relative to the supported object 112. The stops 128 within a selected stop mechanism 116 can be configured so that at least some rotation of the object from a neutral position can be performed without engaging the stop mechanism 116. Accordingly, some or all of the stop mechanisms 116 within a stop system 104 only operate to provide a force that opposes further rotation of the object 112 about an axis when the object 112 has reached or exceeded some selected amount of rotation in one or both directions away from the neutral position. Moreover, the free range or rotation about an axis allowed by each stop mechanism 116 within a set 114 can be the same, such that all of the stop mechanisms 116 within a set engage when the object 112 reaches that same degree of rotation relative to the axis of rotation.

Figure 2:
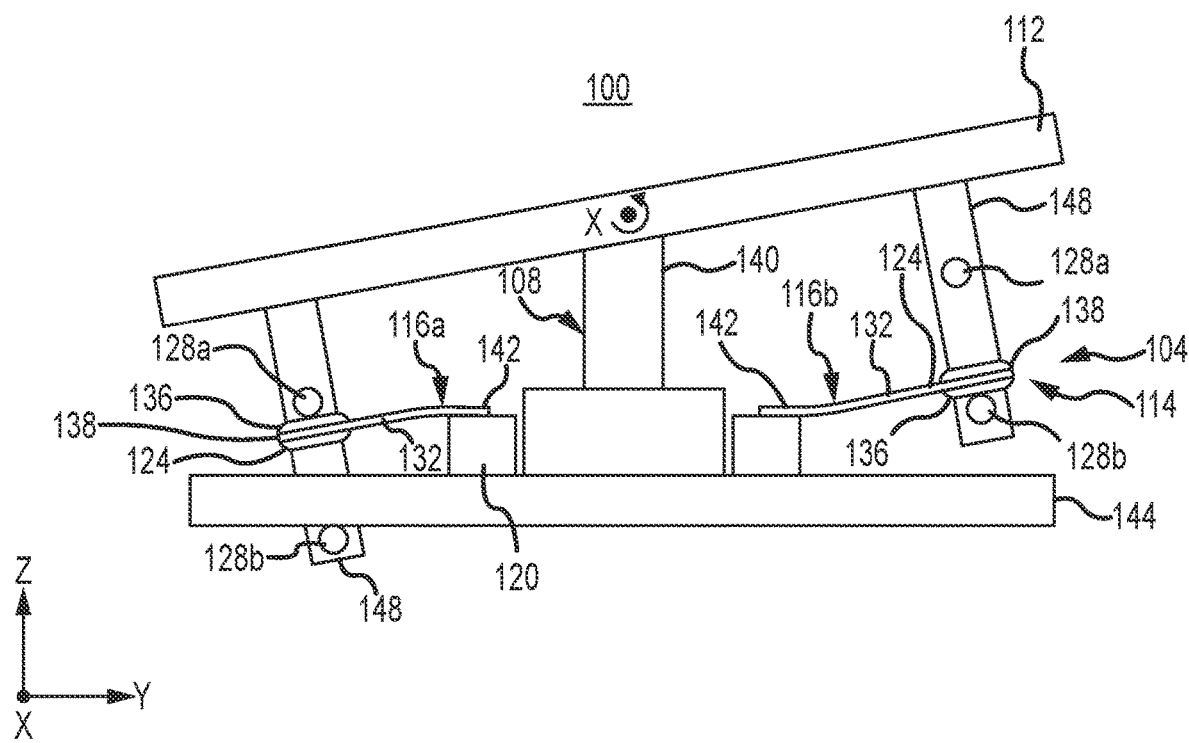
FIG. 2 is a view in elevation of an assembly including a stop system in accordance with embodiments of the present disclosure, with the stop mechanism engaged.

FIG. 2 is a view in elevation of the assembly 100 including the stop system 104 of FIG. 1, but with the object 112 rotated about the X axis in a first direction, and with the stop system 104 engaged. More particularly, each stop mechanism 116 of a set 114 of stop mechanisms 116 on either side of the X axis are engaged. In the first stop mechanism 116a, a first one 128a of the pair of stops 128 is in contact with the contact member 136 on a first side of the flexure member 132, and the flexure member 132 is deflected towards the base 144. In the second stop mechanism 116b, a second one 128b of the pair of stops 128 is in contact with the contact member 136 on a second side of the flexure member 132, and the flexure member 132 is deflected away from the base. In accordance with embodiments of the present disclosure, each flexure member 132 is deflected from a rest position by the same amount, and each flexure member 132 within a set 114 applies the same amount of force. Moreover, the force applied by each stop mechanism 116 within the set 114 generally opposes further rotation of the object 112 about the X axis in the first direction, and provides a gradually increasing braking force as the degree of rotation in the first direction increases.

Figure 3:
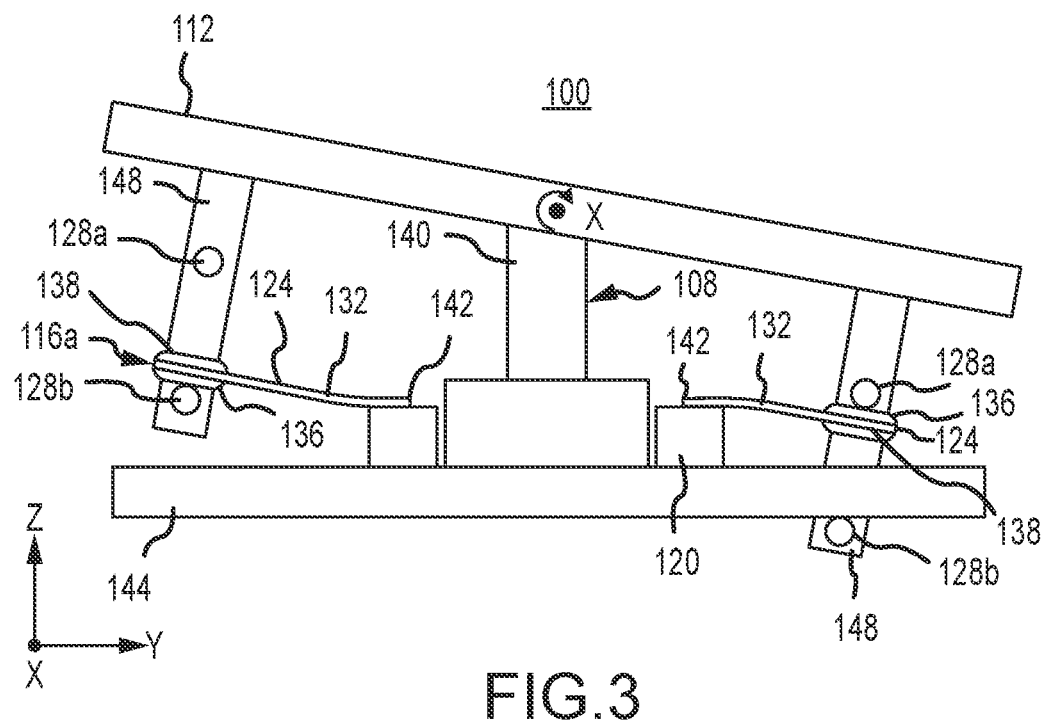
FIG. 3 is another view in elevation of an assembly including a stop system in accordance with embodiments of the present disclosure, with the stop mechanism engaged.

FIG. 3 is a view in elevation of the assembly 100 including a stop system 104 of FIG. 2, but with the object 112 rotated about the X axis in a second direction by at least some selected amount, and with the stop system 104 engaged. With the object 112 rotated in the second direction, a second one 128b of the pair of stops 128 in the first stop mechanism 116a is in contact with the contact member 136 on a second side of the flexure member 132, and the flexure member 132 is deflected away from the base 144. In the second stop mechanism 116b, a first one 128a of the pair of stops 128 is in contact with the contact member 136 on a first side of the flexure member 132, and the flexure member 132 is deflected towards the base 144. As in the case of rotation in the first direction, with the object 112 rotated in the second direction to a point that engages the stop system 104, each flexure member 132 is deflected from a rest position by the same amount, and each flexure member 132 applies the same amount of force. In this case, that force generally opposes further rotation of the object 112 about the X axis in the second direction, and provides a gradually increasing braking force as the degree of rotation in the second direction increases.

As depicted in FIGS. 1-3, the stops 128 are fixed to a moving side or portion of the suspension system 108 (or object 112), and the fixed ends of the flexure members 132 are fixed to the base 144. However, in accordance with further embodiments of the present disclosure, the fixed ends of the flexure members 132 are connected to the suspension system 108 (or object 112), and the stops 128 are fixed to the base 144.

Although the illustrated example places the entirety of a first stop mechanism 116 in a given set 114 on a first side of an axis of rotation X, and the entirety of the second stop mechanism 116 in that set 114 on a second side of the axis of rotation X, such a configuration is not required. Instead, the stop mechanisms 116 within a set 114 need only act on opposite sides of the axis. For example, in at least some embodiments the contact pad 136 and stops 128 of a first stop mechanism 116 are located on a first side of an axis, and the contact pad 136 and stops 128 of a second stop mechanism 116 are located on a second side of the axis; other components of the first stop mechanism 116, such as the fixed ends 142 of the flexure member 132, can be on the second side of the axis of rotation X, and other components of the second stop mechanism 116 can be on the first side of the axis of rotation X. As can be appreciated by one of skill in the art after consideration of the present disclosure, other configurations of stop mechanisms 116 are possible in which braking forces provided by the stop mechanisms 116 are applied to a supported object 112 on different sides of an axis of rotation, even though various components of the stop mechanisms 116 are not themselves disposed on the different sides of the axis of rotation.

Figure 4:
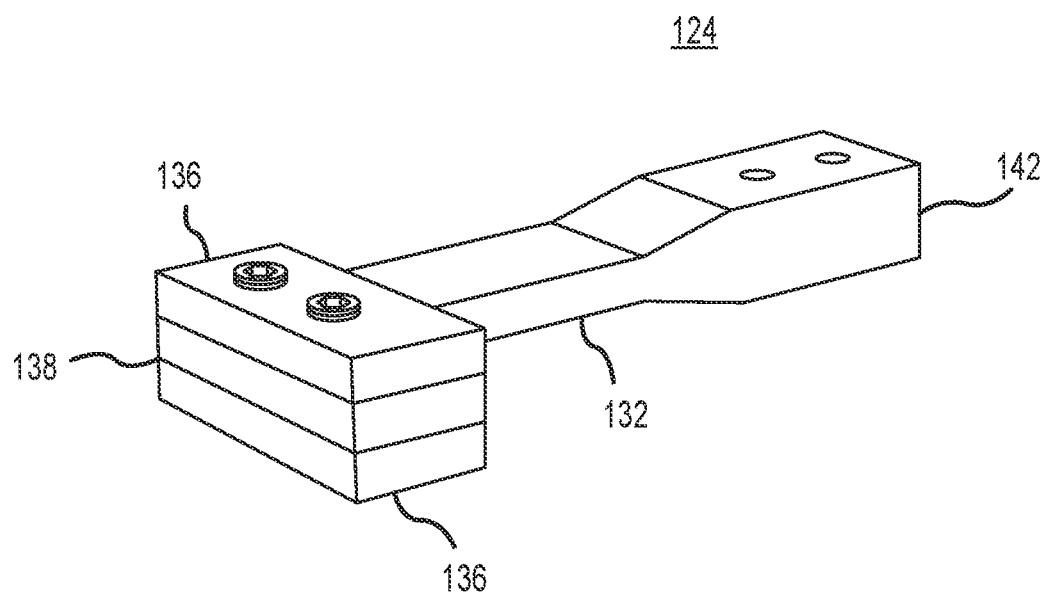
FIG. 4 is a perspective view of a flexure assembly in accordance with embodiments of the present disclosure.

With reference now to FIG. 4, a flexure assembly 124 in accordance with at least some embodiments of the present disclosure is depicted in a perspective view. In this example, the flexure assembly 124 includes a flexure member 132, and a pair of contact members 136. As shown in the figure, the flexure member 132 can include a relatively thick mounting portion joined to a relatively thin flexure or spring portion by a tapered or transition portion. Alternatively or in addition, a flexure member 132 can have a uniform cross-section, or can be tapered or otherwise variably dimensioned to provide a desired spring rate. In general, the flexure member 132 can be formed from any material that can be configured to provide a desired spring force and acceptable fatigue life. For instance, the flexure member 132 can be formed from an integral piece of metal. As examples, the flexure member 132 can be formed from steel or titanium. As additional examples, but without limitation, the material used to form a flexure member 132 can include metal alloys, composites, plastics, or any other material or combination of materials that is suitable for acting as a spring element.

As shown, one or more contact members 136 can be provided on opposite sides of the free end of each of the flexure members 132. The contact member 136 is placed such that it is interposed between the flexure member 132 and a corresponding stop 128 when the stop system 104 is engaged. The contact member 136 can be configured as an integral piece of material, such as a sleeve that extends over opposite sides of the free end of the flexure member 132, or as separate pieces or pads on opposite sides of the flexure member 132. A contact member 136 can be connected to the flexure member 132 by fasteners, adhered or otherwise fixed to an area at the free end 138 of the flexure member 132. As examples, but without limitation, a contact member 136 can include rubber, an elastomer, nylon, or any other material having a desired damping or shock absorbing characteristic.

Figure 5:
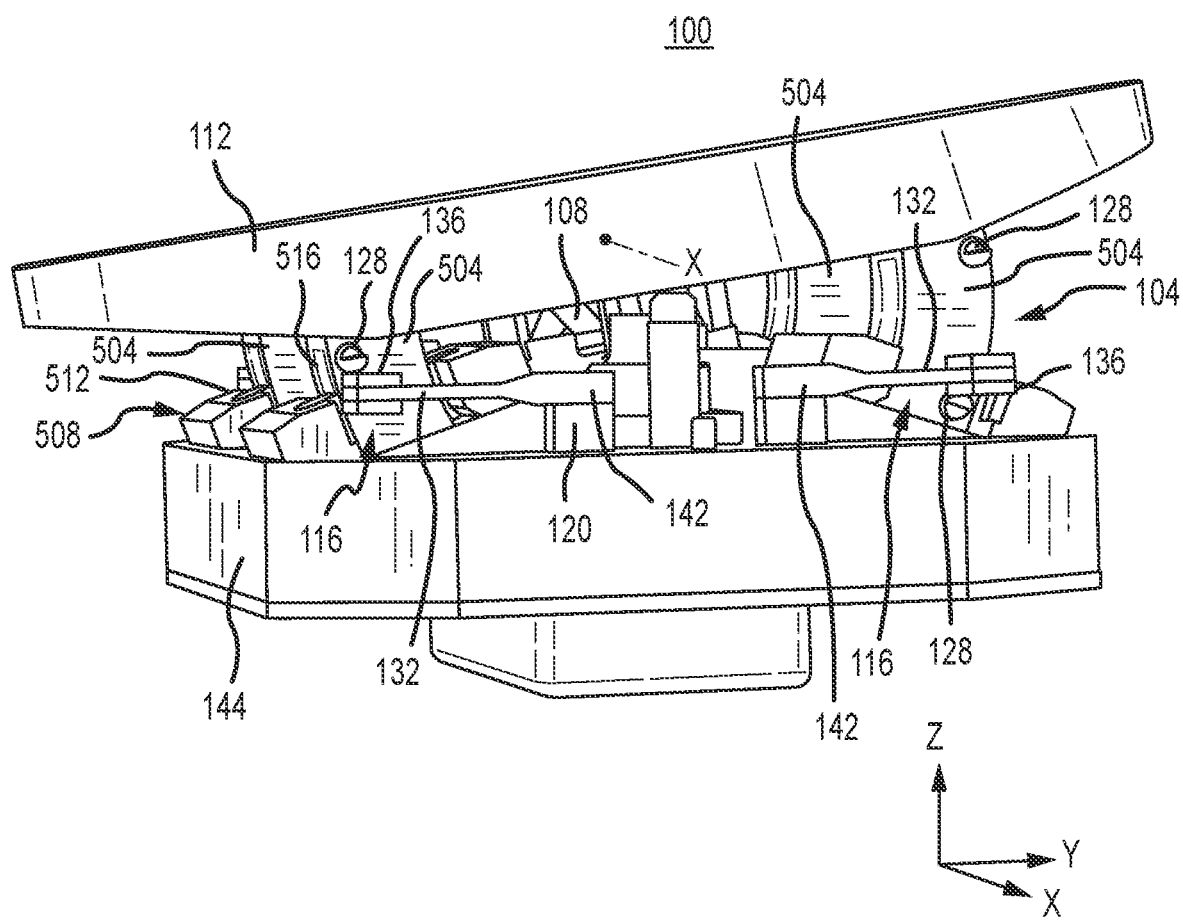
FIG. 5 is a perspective view of an assembly including a stop system in accordance with other embodiments of the present disclosure.

FIG. 5 is a perspective view of an assembly 100 including a stop system 104 in accordance with embodiments of the present disclosure. The assembly 100 generally includes a suspension system 108, in this example a flexure, supporting an object 112, in this example a steering mirror. An end of the suspension system 108 opposite and end connected to the supported object 112 is fixed to a base 144. Strut members 504 are fixed to and extend from the object 112 or from a support structure that fixes or mounts the object 112 to the suspension system 108. The strut members 504 therefore move with the supported object 112 relative to the base 144. In accordance with embodiments of the present disclosure, movement of the object 112 relative to the base 144 is effected by a set of actuators 508. The actuators 508 generally include motor windings 512 fixed to one of the base 144 or the strut members 504, and magnets 516 fixed to the other of the base 144 or the strut members 504. In the illustrated example, the motor windings 512 are fixed to the base 144, and the magnets 516 are fixed to the strut members 504. Stops 128 are also fixed to the strut members 504.

When operated, the actuators 508 can tilt the mirror about the X axis. As shown in FIG. 5, when the degree of rotation of the mirror about the X axis reaches a predetermined amount, the stop mechanisms 116 engage simultaneously. In particular, the support struts 504 move with the mirror, bringing the stops 128 fixed to the struts 504 into contact with the flexure assemblies 124. If the object rotates further, the flexure members 132 will begin to bend, imparting a braking force, counteracting the further rotation of the object 112. Moreover, since all of the stop mechanisms 116, four of which are included in the example of FIG. 5, engage simultaneously, and since the stop mechanisms are disposed symmetrically on either side of the X axis, the braking forces are distributed evenly over a relatively large area. Accordingly, any shock forces or other forces that might negatively affect the supported object 112, the suspension system 108, or other components, are reduced or eliminated.

Figure 6A:
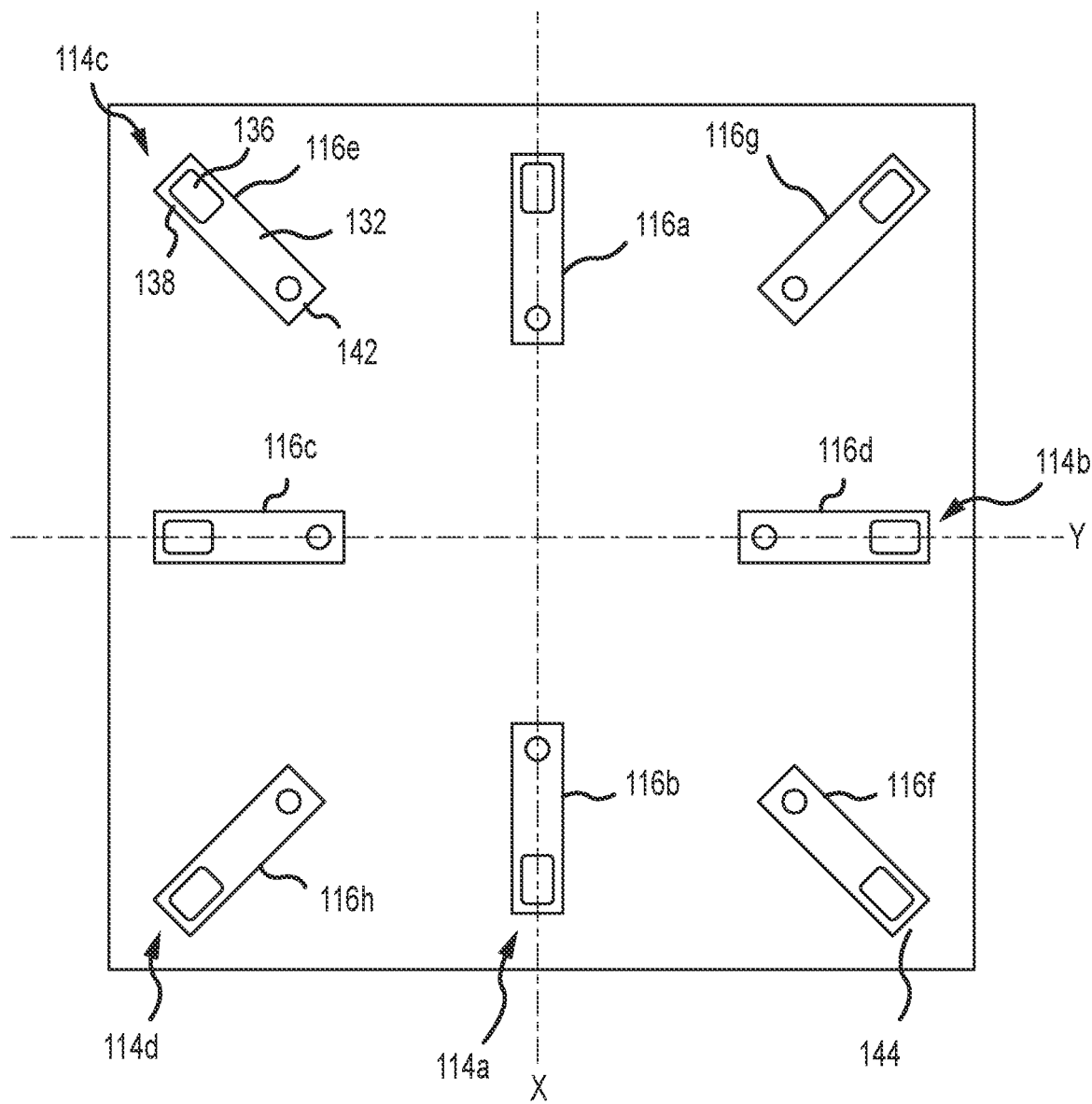
FIGS. 6A-6B are top plan views of a base with stop mechanism components in various configurations in accordance with embodiments of the present disclosure.
Figure 6B:
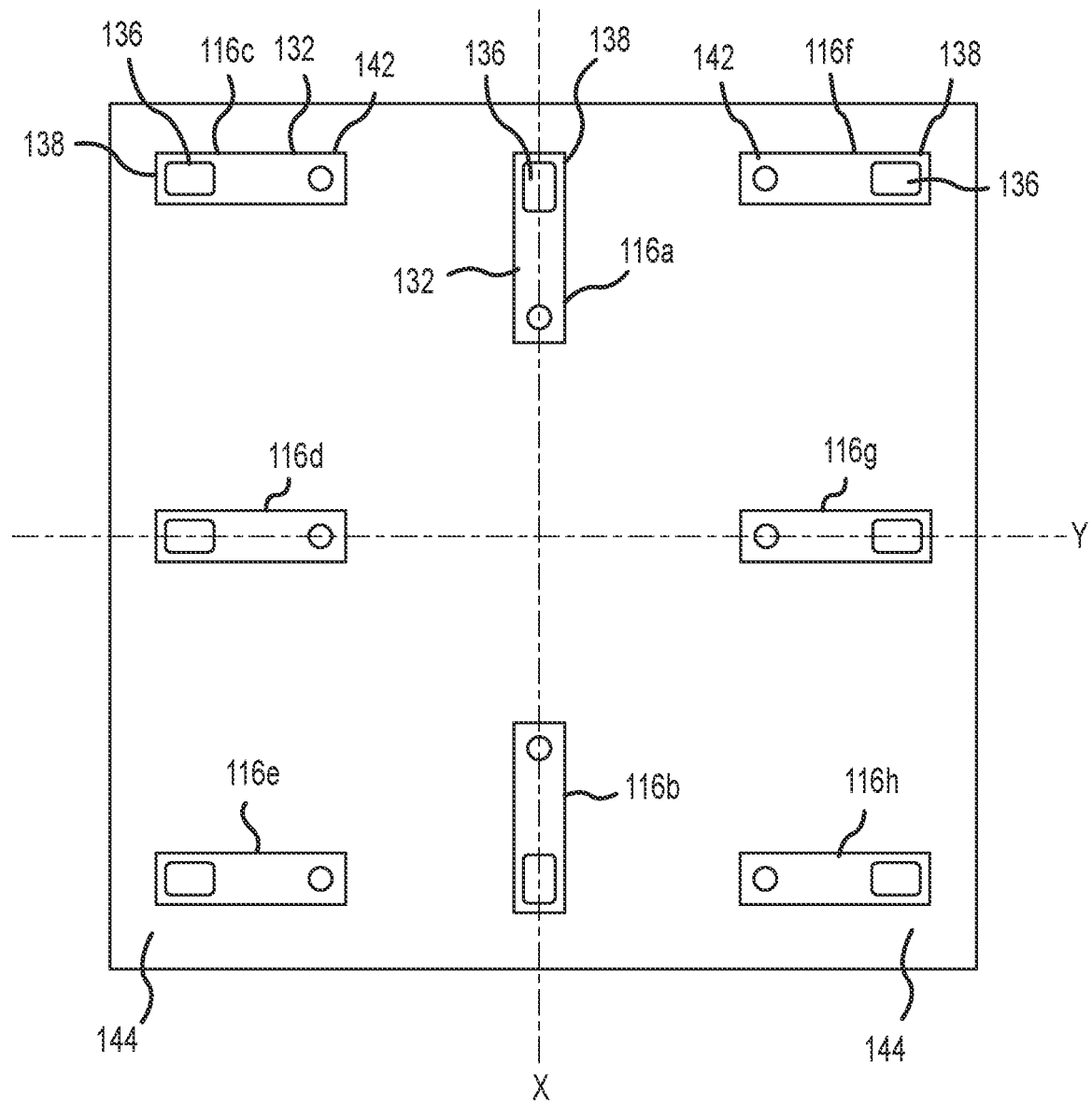

FIGS. 6A and 6B are top plan views of portions of assemblies 100 incorporating stop systems 104 in accordance with embodiments of the present disclosure. In particular, example locations of flexure assembly 124 portions of stop mechanisms 116 relative to X and Y axes of rotation for an object 112 (not shown in FIG. 6A or 6B) are depicted. In both of these examples, an object 112 is supported by a suspension mechanism 140 (not shown in FIG. 6A or 6B) such that it can be selectively rotated or oscillated about one or both of the X and Y axes. In order to brake or limit the rotation of the object 112 about the axes, the flexure assemblies 124 of the stop mechanisms 116 are disposed about opposite sides of the axes.

In the example of FIG. 6A, the stop mechanisms 116 are disposed symmetrically about the X and Y axes in first 114a, second 114b, third 114c and fourth 114d sets. More particularly, the first set 114a includes first 116a and second 116b stop mechanisms that are disposed on opposite sides of and spaced equidistant from the Y axis, and along the X axis; the second set 114b includes third 116c and fourth 116d stop mechanisms that are disposed on opposite sides of and spaced equidistant from the X axis, and along the Y axis; the third set 114c includes fifth 116e and sixth 116f stop mechanisms that are disposed opposite one another in the top left and lower right quadrants of the base 144 respectively; and the fourth set 114d includes seventh 116g and eighth 116h stop mechanisms that are disposed opposite one another in the top right and lower left quadrants of the base 144 respectively. In general, when the supported object 112 reaches a predetermined degree of rotation about the Y axis, the first 116a, second 116b, fifth 116e, sixth 116f, seventh 116g, and eighth 116h stop mechanisms will engage. When the supported object 112 reaches a predetermined degree of rotation about the X axis, the third 116c, fourth 116d, fifth 116e, sixth 116f, seventh 116h, and eighth 116g stop mechanisms will engage. Accordingly, in this exemplary embodiment, the stop mechanisms 116 disposed in the quadrants between the X and Y axes are engaged with rotation about either the X or Y axes, while the stop mechanisms 116 disposed along one axis are only engaged in response to a rotation about the other axis.

As can be appreciated by one of skill in the art after consideration of the present description, the different sets 114 of stop mechanisms 116 can be configured to engage when the object 112 has rotated by different amounts relative to a selected axis. For example, the first 116a and second 116b could be configured to engage before the other stop mechanisms 116e-116h that can be engaged in response to a rotation about the Y axis. In accordance with further embodiments of the present disclosure, a stop system 104 that provides for balanced and progressive braking of rotations of an object about the X and Y axes can be configured using different combinations of stop mechanisms. For example, a stop system 104 can be configured with only the first 114a and second 114b sets of stop mechanisms 116, or just the third 114c and fourth 114d sets of stop mechanisms 116. As another example, a stop system can include one of the first 114a and second 114b sets of stock mechanisms, and the third 114c and fourth 114d sets of stop mechanisms 116.

In the example of FIG. 6B, the stop mechanisms 116 are disposed symmetrically with respect to any one of the subject axes, but are asymmetrical when the set 114 of stop mechanisms 116 of one axis is compared to the set 114 of stop mechanisms 114 of the other axis. In this example configuration, first 116a and second 116b stop mechanisms of a first set 114a are depicted on opposite sides of and spaced equidistant from the Y axis, and aligned with the X axis, such that they engage after rotation of the object 112 about the Y axis of at least a predetermined amount. In addition, a second set of stop mechanisms 114b that includes third 116c, fourth 116d, and fifth 116e stop mechanisms disposed on a first side of the X axis, and sixth 116f, seventh 116g, and eight 116h stop mechanisms disposed on a second side of the X axis, such that they engage after rotation of the object about the X axis of at least a predetermined amount. In addition, while the fourth 116d and seventh 116g stop mechanism only engage in response to a sufficient rotation of the object 112 about the X axis, the third 116c, fifth 116e, sixth 116f, and eighth 116h stop mechanisms can be configured to engage in response to a sufficient rotation of the object 112 about the Y axis, in addition to engaging in response to a sufficient rotation of the object 112 about the X axis.

Accordingly, the embodiments of FIGS. 6A and 6B illustrate that a stop system 104 can include more than one pair of stop mechanisms 116 for an axis of rotation. In addition, different numbers of stop mechanisms 116 acting in response to rotations about different axes can be provided. For example, different amounts of braking force can be supplied to different degrees of rotation about a single axis, or different or the same amounts of braking force can be supplied to rotations about first and second axes. Furthermore, stop mechanisms 116 can operate to brake rotations about more than one axis individually or simultaneously. In various embodiments, orientation of a stop mechanism 116, and in particular of a flexure assembly 124 along a line that is parallel to one of the axes of rotation is not required. Moreover, embodiments of the present disclosure provide stop mechanisms 116 that limit rotation of the object 112 about each axis in a controlled manner.

Figure 7A:
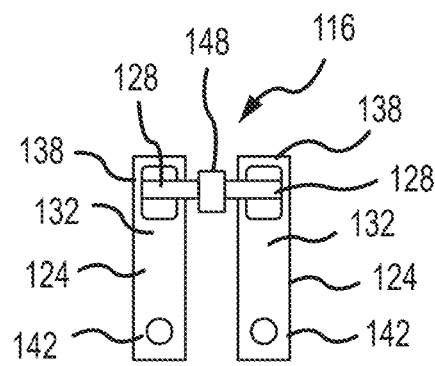
FIGS. 7A-7C are views of example stop mechanisms in accordance with embodiments of the present disclosure.
Figure 7B:
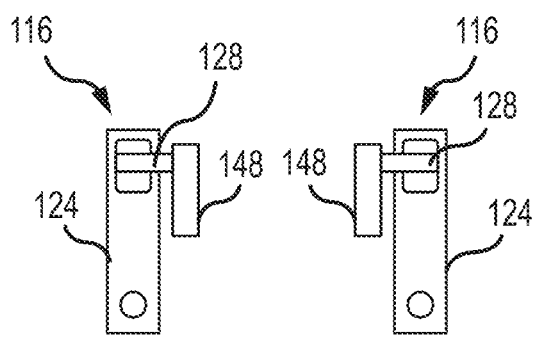
Figure 7C:
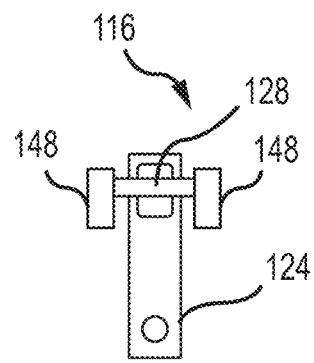

FIGS. 7A-7C depict example stop mechanism 116 arrangements that can be included in stop systems 104 in accordance with embodiments of the present disclosure. In FIG. 7A, a portion of a stop system 104 with a stop mechanism 116 configured like or similarly to those illustrated in FIGS. 1-3 is shown from a top plan view. In this configuration, the stop mechanism 116 can include a first pair of stops 128 that extend from either side of a strut 148 that moves with the supported object (not shown in FIG. 7A) and a corresponding pair of flexure assemblies 124. The flexure assemblies 124 and stops 128 are arranged such that the stop mechanisms 128 engage the flexure assemblies 124 simultaneously upon a sufficient rotation of the object 112. In order to provide braking for a rotation of the object 112 in the opposite direction, a second pair of stops (not shown) are mounted to the strut 148 below the first pair of stops 128, and on an opposite side of the free end 138 of the flexure assembly 124.

In FIG. 7B, a portion of a stop system 104 with stop mechanisms 116 configured like or similarly to those illustrated in FIG. 5 is shown from a top plan view. In particular, two stop mechanisms 116 on one side of an axis of rotation of a supported object (not shown in FIG. 7B) are shown. Each of the stop mechanisms includes a stop that extends from one side of a strut 148 that moves with the supported object 112. The two stop mechanisms 116 are configured such that the stops 128 engage the corresponding flexure assemblies simultaneously upon a sufficient rotation of the object. In order to provide braking for a rotation of the object in the opposite direction, each stop mechanism 116 includes a second stop below the illustrated stop 128, on an opposite side of the free end 138 of the flexure assembly 124.

In FIG. 7C, a portion of a stop system 104 including a stop mechanism 116 is shown from a top plan view in which the stop mechanism 116 includes a stop 128 that extends between a pair of struts 148 that move with the supported object (not shown in FIG. 7C) and a corresponding flexure assembly 124. In order to provide braking for a rotation of the object 112 in the opposite direction, a second stop (not shown) is mounted to the struts 148 below the first stop 128, and on an opposite side of the free end 138 of the flexure assembly 124.

Figure 8:
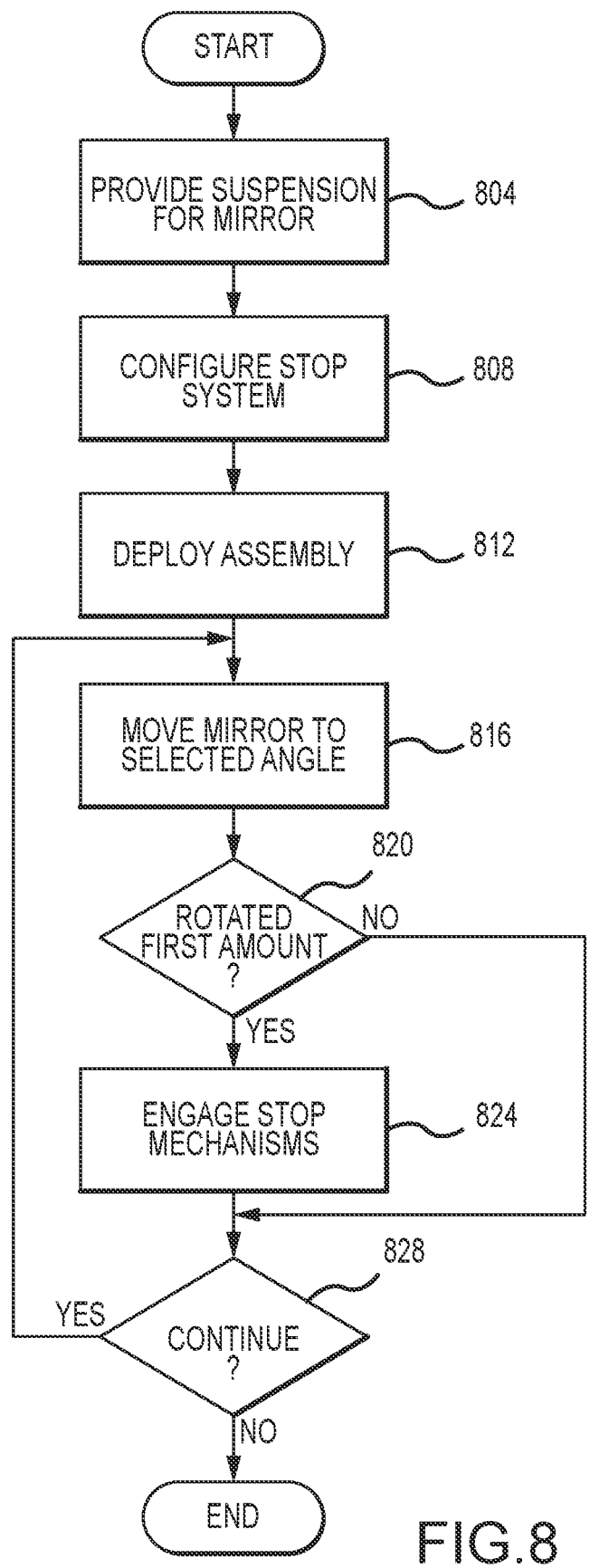
FIG. 8 is a flowchart depicting aspects of a method for limiting stresses in a suspension system in accordance with embodiments of the present disclosure.

With reference now to FIG. 8, aspects of a process or method for providing an assembly 100 incorporating an suspended object 112 in which rotation of the object 112 about an axis of rotation of a suspension system 108 is limited to a selected amount are illustrated. Initially, a suspension system 108 is provided to support the object 112 relative to a base 144, and to provide selected directions of rotation (step 804). As examples, but without limitation, the object 112 can include a fast steering or scanning mirror of an optical system, and the suspension system 108 can include a cross flexure type suspension that allows rotation of the mirror about first and second perpendicular axes, while restricting movement of the mirror in all other directions. At step 808, a stop system 104 is configured. In accordance with embodiments of the present disclosure, the stop system includes one or more pairs of stop mechanisms 116, with a first stop mechanism 116 in each pair acting from a first side of an axis of rotation, and with a second stop mechanism 116 in the pair acting from a second side of the axis of rotation. Moreover, each stop mechanism 116 in a pair of stop mechanisms 116 is configured to apply an equal but opposite force that opposes rotation of the supported object 112 beyond a selected amount.

The assembly 100, including the object 112 supported by the suspension system 108 and the associated stop system 104, can then be deployed (step 812). Deployment of the assembly 100 can include, for example, integrating the assembly 100 into an optical system that utilizes the ability to rotate a mirror in a controlled manner about one or more axes for purposes of scanning or pointing a beam or field of view of the optical system. At step 816, actuators included in the assembly 100 can be operated to move the mirror to a selected angle relative to the base by rotating the mirror about one or more axes. If the mirror is rotated to at least a first amount about an axis (step 820), stop mechanisms 116 associated with that axis are engaged (step 824). In particular, at least first and second stop mechanisms 116 disposed on opposite sides of the axis, are engaged simultaneously and provide equal and opposite forces to oppose further rotation of the object 112. At step 828, a determination is made as to whether operation of the assembly 100 is to continue. If yes, the process can return to step 816, and operation of the entire assembly 100, including of the actuators and as necessary the stop mechanisms 116, can continue. Otherwise, the process can end.

Although various examples of an assembly 100 that incorporates an object 112 in the form of a mirror, such as a fast steering mirror, have been described, embodiments of the present disclosure are not so limited. For example, a suspension system 100 with a stop system 104 and a suspension system in accordance with embodiments of the present disclosure can be used as a support for any object, structure or component in which it is desirable to provide two degrees of freedom of movement about (or nearly about) a fixed point between a base structure and a supported structure. Moreover, an assembly 100 in accordance with embodiments of the present disclosure can be used in applications where a relatively high frequency of oscillation or change in angle is required or desirable.

Embodiments of the present disclosure relate to suspension systems for supporting objects, and more particularly mirrors, to be rotated or oscillated about two perpendicular axes while restricting translational movement in all other directions. Stops are provided on both sides of the suspension system (mirror living hinge flexure) to reduce the stresses in the suspension due to impacts on the travel limiting stops. Steering mirror assemblies require stops to prevent over travel of the flexure mechanism. This is particularly important in situations where the mirror may lose control (run away condition or max current) or may experience high external vibration or acceleration loads. Prior art approaches allow forces to develop in the suspension itself when the mirror impacts the travel stop. In addition, previous designs were typically much smaller and had about half of the travel range requirement. A larger design requires changes to enable the heavier components and wider range of travel.

In previous designs, one-sided stops were provided to limit travel when a single stop is engaged. When this happens, loads can spike in the rotation flexure of the mirror. In contrast, embodiments of the present disclosure provide multiple stops that are engaged simultaneously on each side of the mirror to change the dynamics of an impact and significantly reduce forces and stresses carried through the mirror rotation flexure. The stop mechanisms are flexible to allow a gentle reduction in speed and allow all stops to engage within reasonable manufacturing tolerances. Configurations with two or multiple stop assemblies can be utilized to balance the stop forces on either side of the mirror rotation point.

The stop system provided by embodiments of the present disclosure enables long life in a steering mirror with a large range of motion capability. Past designs had either a much lower range of travel or a much smaller and lighter devices, typically 3" diameter or less. None of the prior designs combine the range of travel and the larger mirror size in current designs. Enabling a higher range of motion simplifies other aspects of the steering system gimbal design and can reduce the number of bearings or motors required in other parts of the system. This provides cost and packaging size advantages over prior designs. Large rotations require a flexure design which is very thin and optimized for the rotation motion. A thicker or stiffer flexure, to resist impact forces, would not allow the large rotations enabled by embodiments of the present disclosure.

When a mirror strikes a stop, the dynamics can be such that the mirror may translate on its mounting flexure. This translation can result in high stresses that will fatigue or lead to material failure in the flexure. In systems with relatively high travel distances or rotation ranges, the speed with which a mirror could be moving when hitting a stop is a significant issue. The kinetic energy after travelling over a wide rotation distance can be very high resulting in high impact forces on the stop and the mounting flexure. Stop systems as presented herein include a plurality of balanced stops that engage on at least two sides of the mirror simultaneously. Such engagement prevents the mirror from translating severely on its mounting flexure and significantly decreases the stresses observed in the flexure and therefore extending the working life of the design. For example, for a particular mirror and flexure design, a conventional single stop design exhibited mounting flexure strain energy of 1.7% and a maximum stress in the mounting flexure due to impact of 208 ksi, while a multiple stop design in accordance with embodiments of the present disclosure exhibited mounting flexure strain energy of <0.1% and a maximum stress of 18.4 ksi.

The reduction in stress in the suspension system or mounting flexure 108 provided by the multiple stop mechanism 116 system of embodiments of the present disclosure can be realized as a reduction in the lateral displacement of the mirror or other supported object 112 when a limit of rotation is reached. Embodiments of the present disclosure can spread strain energy into components associated with the stop mechanisms 116, reducing stresses in the suspension system 108 itself. By reducing stress in the mounting flexure, embodiments of the present disclosure can increase the usable lifetime of the assembly 100, and in particular the suspension system 108.

During mirror stop impact, the rigid body mode that describes the rotation about a given axis, becomes a pitch mode about the rotation axis with deflection and strain energy in the stop and the flexure. Adding an additional spring (flexure stop) changes the character of the dynamics such that the strain energy is mostly in the stops rather than in the flexure. This reduces the stress levels in the flexure and allows the flexure to survive many thousands of impacts.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A stop system, comprising:
a first stop mechanism, the first stop mechanism including:
a first stop, wherein the first stop of the first stop mechanism has a fixed position relative to a first one of a supported object and a base; and
a first flexure assembly having a flexure member with a fixed end and a free end, wherein the fixed end of the first flexure assembly has a fixed position relative to a second one of the supported object and the base; and
a second stop mechanism, the second stop mechanism including:
a first stop, wherein the first stop of the second stop mechanism has a fixed position relative to the first one of the supported object and the base; and
a first flexure assembly having a flexure member with a fixed end and a free end, wherein the fixed end of the first flexure assembly of the second stop mechanism has a fixed position relative to the second one of the supported object and the base;
wherein, in the first stop mechanism, the first stop engages a first side of the free end of the flexure member of the first flexure assembly in response to a rotation of the supported object relative to the base in a first direction about a first axis of rotation of at least a first predetermined amount, and
wherein, in the second stop mechanism, the first stop engages a second side of the free end of the flexure member of the first flexure assembly in response to the rotation of the supported object relative to the base in the first direction about the first axis of rotation of at least the first predetermined amount.

2. The stop system of claim 1, wherein the first stops of the first and second stop mechanisms are connected to the supported object and have fixed positions relative to the supported object, and wherein the fixed ends of the first and second flexure assemblies are connected to the base and have fixed positions relative to the base.

3. The stop system of claim 1, wherein the first stop mechanism is disposed on a first side of the axis of rotation, and wherein the second stop mechanism is disposed on a second side of the first axis of rotation.

4. The stop system of claim 1, wherein the first stop mechanism further includes a second stop,
wherein the second stop mechanism further includes a second stop,
wherein, in the first stop mechanism, the second stop engages a second side of the free end of the flexure member of the first flexure assembly in response to a rotation of the supported object relative to the base in a second direction about the first axis of rotation of at least a second predetermined amount, and
wherein, in the second stop mechanism, the second stop engages a first side of the free end of the flexure member of the first flexure assembly in response to the rotation of the supported object relative to the base in the second direction about the first axis of rotation of at least the second predetermined amount.

5. An assembly, comprising:
a base;
an object;
a suspension system, wherein the suspension system connects the object to the base and allows the object to move relative to the base about at least a first axis;
a plurality of stop mechanisms, including:
a first stop mechanism acting on a first side of the first axis, including:
a plurality of stops, wherein the stops are connected to a first one of the base and the object;
a flexure assembly, wherein a first side of a first end of the flexure assembly is disposed to contact a first one of the plurality of stops with the object rotated in a first direction about the first axis, wherein a second side of the first end of the flexure assembly is disposed to contact a second one of the plurality of stops with the object rotated in a second direction about the first axis, and wherein a second end of the flexure assembly is fixed to a second one of the base and the object; and
a second stop mechanism acting on a second side of the first axis, including:
a plurality of stops, wherein the stops are fixed to the first one of the base and the object; and
a flexure assembly, wherein a second side of a first end of the flexure assembly is disposed to contact a second one of the plurality of stops with the object rotated in the first direction about the first axis, wherein a first side of the first end of the flexure assembly is disposed to contact a first one of the plurality of stops with the object rotated in the second direction about the first axis, and wherein a second end of the flexure assembly is fixed to the second one of the base and the object.

6. The assembly of claim 5, wherein the stops of the first and second stop mechanisms are fixed to the object, and wherein the first ends of the flexure assemblies of the first and second stop mechanisms are fixed to the base.

7. The assembly of claim 5, wherein each flexure assembly includes a flexure member and a contact member.

8. The assembly of claim 5, wherein the suspension system also allows the object to rotate about a second axis that is perpendicular to the first axis, the assembly further comprising:
a third stop mechanism acting on a first side of the second axis, including:
a plurality of stops, wherein the stops are fixed to the first one of the base and the object; and
a flexure assembly, wherein a first side of a first end of the flexure assembly is disposed to contact a first one of the plurality of stops with the object rotated in a first direction about the second axis, wherein a second side of the first end of the flexure assembly is disposed to contact a second one of the plurality of stops with the object rotated in a second direction about the second axis, and wherein a second end of the flexure assembly is fixed to the second one of the base and the object; and
a fourth stop mechanism acting on a second side of the second axis, including:
a plurality of stops, wherein the stops are fixed to the first one of the base and the object; and
a flexure assembly, wherein a second side of a first end of the flexure assembly is disposed to contact a second one of the plurality of stops with the object rotated in the first direction about the second axis, wherein a first side of the first end of the flexure assembly is disposed to contact a first one of the plurality of stops with the object rotated in the second direction about the second axis, and wherein a second end of the flexure assembly is fixed to the second one of the base and the object.

9. The assembly of claim 8, wherein the flexure assemblies of the first and second stop mechanisms are parallel to one another, and wherein the flexure assemblies of the third and fourth stop mechanisms are parallel to one another.

10. The assembly of claim 8, wherein all of the stop mechanisms are engaged in response to a rotation of the object about the first axis by at least a first amount, and wherein all of the stop mechanisms are engaged in response to a rotation of the object about the second axis by at least a second amount.

11. The assembly of claim 5, wherein the plurality of stop mechanisms includes an even number of stop mechanisms.

12. The assembly of claim 11, wherein the flexure assemblies each include a flexure member and at least one contact member.

13. The assembly of claim 12, wherein the flexure members are metal springs.

14. The assembly of claim 13, wherein the contact members are nylon pads.

15. The assembly of claim 5, wherein the object is a mirror.

16. The assembly of claim 5, further comprising a plurality of actuators, wherein the actuators are operable to move the object relative to the base about at least the first axis of rotation.

17. A method for limiting movement of a suspension system, comprising:
supporting an object with a suspension system that allows motion of the object about at least a first axis of rotation relative to a base;
locating a first stop mechanism that includes a plurality of stops and at least a portion of a flexure assembly to act on a first side of the first axis of rotation, wherein the flexure assembly engages a first one of the stops of the first stop mechanism with the object rotated by a first amount in a first direction about the first axis of rotation, and wherein the flexure assembly engages a second one of the stops of the first stop mechanism with the object rotated by a second amount in a second direction about the first axis of rotation; and
locating a second stop mechanism that includes a plurality of stops and at least a portion of a flexure assembly to act on a second side of the first axis of rotation, wherein the flexure assembly engages a second one of the stops of the second stop mechanism with the object rotated by the first amount in the first direction about the first axis of rotation, and wherein the flexure assembly engages a first one of the stops of the second stop mechanism with the object rotated by the second amount in the second direction about the first axis of rotation.

18. The method of claim 17, further comprising:
applying an increasing force by the first and second stop mechanisms as an amount of rotation of the object about the first axis of rotation increases from the first amount of rotation in the first direction.

19. The method of claim 18, wherein, for a given amount of rotation of the object about the first axis by at least the first amount, an amount of force applied by the first stop mechanism is equal to an amount of force applied by the second stop mechanism.

20. The method of claim 17, wherein the suspension system additionally allows motion of the object about a second axis of rotation relative to the base, wherein the second axis is perpendicular to the first axis, the method further comprising:
locating a third stop mechanism that includes a plurality of stops and at least a portion of a flexure assembly to act on a first side of the second axis of rotation, wherein the flexure assembly engages a first one of the stops of the third stop mechanism with the object rotated by a third amount in a first direction about the second axis of rotation, and wherein the flexure assembly engages a second one of the stops of the third stop mechanism with the object rotated by a fourth amount in a second direction about the second axis of rotation; and
locating a fourth stop mechanism that includes a plurality of stops and at least a portion of a flexure assembly to act on a second side of the second axis of rotation, wherein the flexure assembly engages a second one of the stops of the fourth stop mechanism with the object rotated by the third amount in the first direction about the second axis of rotation, and wherein the flexure assembly engages a first one of the stops of the fourth stop mechanism with the object rotated by the fourth amount in the second direction about the second axis of rotation.

* * * * *